(12) United States Patent  (10) Patent No.: US 8,687,290 B2
Jahn et al.  (45) Date of Patent: Apr. 1, 2014

(54) VARIABLE FILTER COMPENSATION FOR HIGH-APERTURE CAMERA LENSES

(75) Inventors: Dirk Jahn, Erfurt (DE); Vladan Blahnik, Oberkochen (DE)

(73) Assignee: Carl Zeiss AG, Oberkochen (DE)

( * ) Notice: Subject to any disclaimer, the term of this patent is extended or adjusted under 35 U.S.C. 154(b) by 0 days.

(21) Appl. No.: 13/549,011

(22) Filed: Jul. 13, 2012

(65) Prior Publication Data

US 2013/0021675 A1  Jan. 24, 2013

(30) Foreign Application Priority Data

Jul. 18, 2011 (DE) .......................... 10 2011 107 985

(51) Int. Cl.
*G02B 9/12* (2006.01)
*H04N 5/225* (2006.01)
*G02B 13/22* (2006.01)

(52) U.S. Cl.
USPC ............................ 359/738; 348/335; 348/340

(58) Field of Classification Search
CPC ............................ G02B 27/0025; G02B 21/02
USPC .......... 348/335, 340, 342; 359/691, 724, 738, 359/793
See application file for complete search history.

(56) References Cited

U.S. PATENT DOCUMENTS

| 4,482,220 | A |   | 11/1984 | Schaefer |
|---|---|---|---|---|
| 4,965,630 | A |   | 10/1990 | Kato et al. |
| 5,311,362 | A |   | 5/1994 | Matsumoto et al. |
| 5,978,155 | A | * | 11/1999 | Suenaga ........................ 359/691 |

FOREIGN PATENT DOCUMENTS

| DE | 30 30 205 A1 | 3/1982 |
|---|---|---|
| EP | 0 859 259 A2 | 8/1998 |
| JP | 55-55309 | 4/1980 |
| JP | 2007-266186 | 10/2007 |

OTHER PUBLICATIONS

Extended English language translation of European Search Report for Application No. EP 12 17 5844 dated Feb. 1, 2013; 8 pp.

* cited by examiner

*Primary Examiner* — David N Spector

(74) *Attorney, Agent, or Firm* — Harness, Dickey & Pierce, P.L.C.

(57) ABSTRACT

The present invention relates to a lens or objective for a camera, more particularly for a digital camera, comprising a housing, an actuating element arranged on the housing, and a lens element system that can be set into a plurality of settings, wherein the lens element system is embodied in such a way that in at least one setting an f-number is F≤3. The lens element system is furthermore embodied in such a way that an actuation of the actuating element brings about a movement of two optical elements relative to one another, such that an intersection length difference of the lens element system can be set.

17 Claims, 9 Drawing Sheets

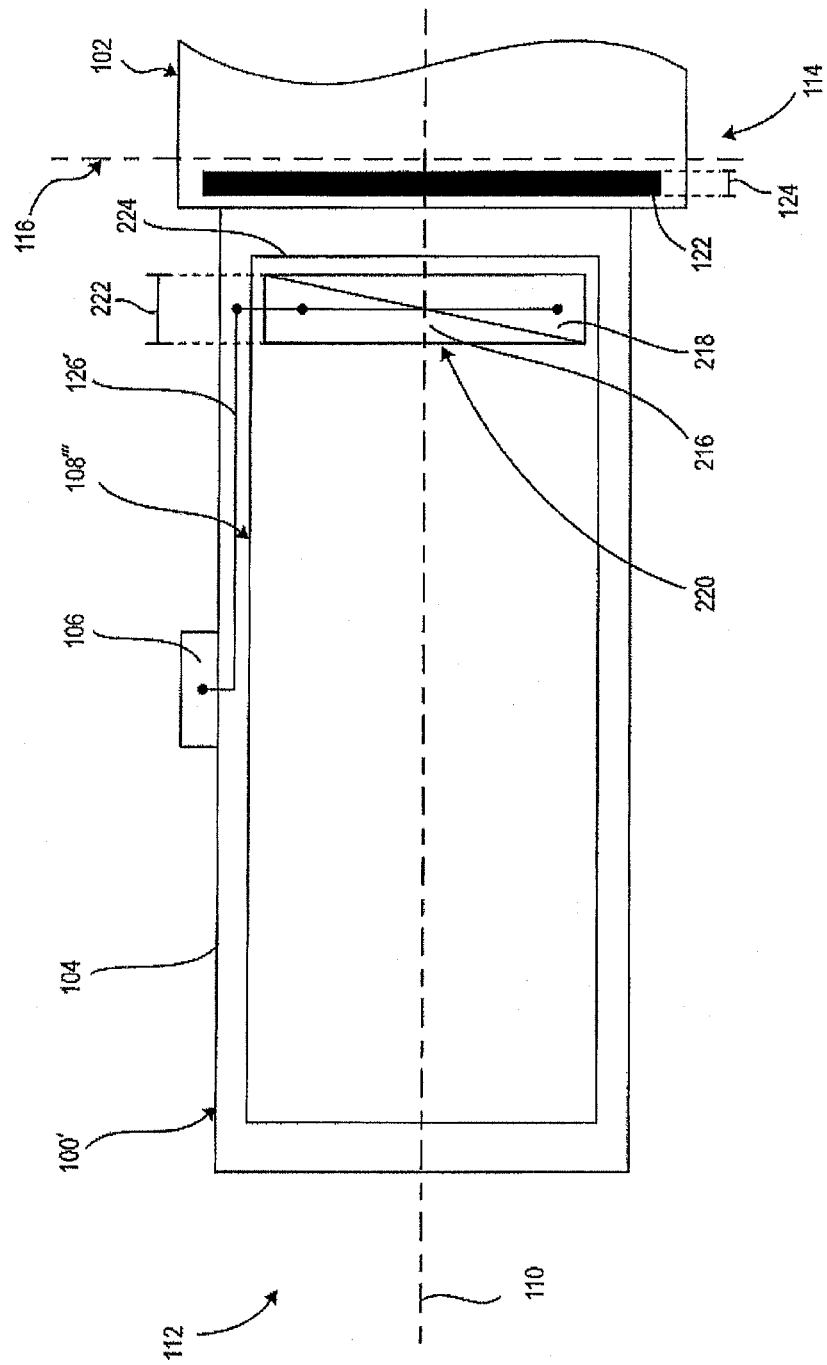

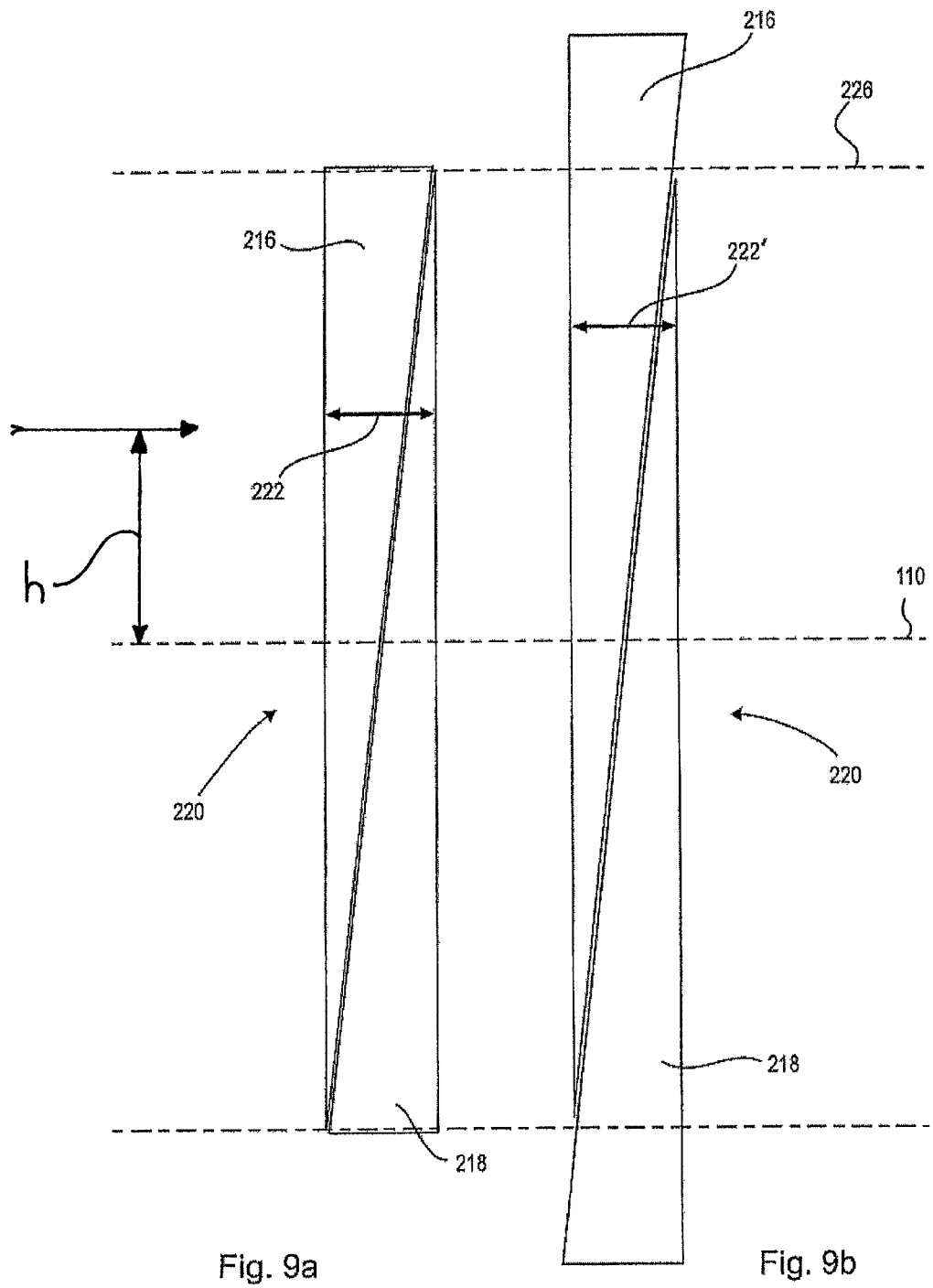

VARIABLE FILTER COMPENSATION FOR HIGH-APERTURE CAMERA LENSES

CROSS-REFERENCE TO RELATED APPLICATIONS

This application claims the priority of German patent application DE 10 2011 107 985.1, filed on Jul. 18, 2011.

BACKGROUND OF THE INVENTION

The present invention relates to a lens or objective for a camera, more particularly for a digital camera, comprising a housing, an actuating element arranged on the housing, and a lens element system that can be set into a plurality of settings, wherein the lens element system is embodied in such a way that in at least one setting an f-number is F≤3.

In cameras that can be set to a small f-number, one of the significantly occurring aberrations is the so-called aperture aberration. The aperture aberration is the so-called spherical aberration. The aperture aberration is all the greater, the further a light beam proceeding from an object point is fanned out in an optical system of a lens before it impinges on the image plane. The rays incident through ring zones that are spaced apart from the optical axis at a distance h intersect at a different image point on the optical axis from the paraxial image point. The aperture aberration can be expressed by the so-called intersection length difference, i.e. the distance between the point of intersection of the beam of rays with the height h of incidence and the point of intersection of the paraxial beam of rays. This intersection length difference or the aperture aberration is a function of h and increases with increasing distance from the optical axis of the lens. In principle, there can be a deviation of the points of intersection parallel to the optical axis of the lens and also transversely with respect to the optical axis of the lens. In so far as an intersection length difference is mentioned in the context of this application and hereinafter, however, this only means the intersection length difference parallel to the optical axis of the lens, i.e. the longitudinal deviation. The latter is a measure of the aperture aberration.

The aperture aberration increases with increasing distance h from the optical axis of the lens. To an approximation, it increases in quadratic dependence on h. Consequently, the aperture aberration becomes relevant only at a certain distance from the optical axis. However, this is the case precisely for high-aperture lenses for cameras. High-aperture lenses in the context of the present application are understood to be those lenses in which the f-number can be set or is set to be ≤3. The f-number is the quotient of the set focal length of the lens and the diameter of the entrance pupil. In this case, the entrance pupil is dependent on the setting of a stop provided in the lens, for example of an aperture stop formed as an iris stop. If the f-number is small, this means that the stop provided in the lens is wide open. In this case, the distance h of a marginal ray still passing through the stop, i.e. of the furthest outwardly situated light ray of a light beam proceeding from a specific object point, is large. The aperture aberration is then also large for this distance. Consequently, in the case of a wide open stop, a larger proportion of light rays proceeding from an object point and impinging on the image plane in the camera have an aperture aberration; the latter is furthermore very large for the marginal rays. That can be counteracted by setting the stop aperture to be small. However, this is not always desired or possible, for example on account of the external light conditions.

In cameras, filters of different thicknesses are often provided upstream of the image plane. In particular, in digital cameras, a low-pass filter is provided upstream of a recording image sensor, for example a CCD sensor, in order to suppress the so-called Moiré effect. In the Moiré effect, undesirable coarse grids occur as a result of the superimposition of two fine grids in the context of an interference pattern. This Moiré effect is known in principle to the person skilled in the art. As stated, it can be suppressed by the use of a low-pass filter. Furthermore, other filters can also be provided in a camera, for example for filtering infrared radiation. The filters have different thicknesses depending on the type of camera. Furthermore, it may be provided that the number and type of the filters are changeable in a camera of a specific type, thus resulting overall in a different thickness of the filters used. One example of a similar camera is disclosed in document DE 100 28 233 A1.

One problem is that such a filter element of specific thickness d also causes a change in the intersection length. Since the filters in the camera are usually situated directly upstream of the image recording sensor, they lie in the convergent beam path and thus cause a lengthening of the intersection length. Since the thickness d and the filters of a camera or the equivalent glass thickness composed of the different refractive indices and thicknesses of the individual filters differs from camera type to camera type, a specific lens can be used with a specific camera type or only with camera types whose filter bundle has the same equivalent glass thickness. A lens is always designed such that it compensates for the lengthening of the intersection length caused by the filters of a specific camera type to be used together with the lens. On the image sensor, the aperture aberration is then completely compensated for. In the case of use together with a different camera type, this compensation is then no longer correct and a significant aperture aberration occurs particularly in the case of a low f-number or wide stop aperture.

In document US 2009/0052064 A1, a plane-parallel optical element of specific thickness is taken into account in the design of the lens element system. The thickness of said plane-parallel optical element is intended to be thicker than the actual thickness of a filter used. Depending on an equivalent glass thickness of an actual filter, a correspondingly thinner plane-parallel optical element than was taken into account in the design is then intended to be provided in the lens. This means, however, that the corresponding plane-parallel optical element provided in the lens is provided once for a specific camera type. If the lens is intended to be used together with a different camera type, it will be necessary to replace the plane-parallel optical element in the lens. However, not only is this time-consuming and complicated, but undesirable aberrations can also be caused, for instance if a new plane-parallel optical element is mounted incorrectly or is contaminated, or a plane-parallel optical element having an incorrect thickness is simply mounted inadvertently.

Therefore, it is an object of the present invention to specify a lens for a camera, more particularly a digital camera, which, even for an inexperienced user, is easily adaptable to a variable filter thickness and can thus be used with different camera types without any problems.

BRIEF SUMMARY OF THE INVENTION

According to one aspect of the invention, there is provided a lens or objective for a camera, in particular a digital camera, the lens comprising a housing, an actuating element arranged on the housing, and a lens element system that can be set into a plurality of settings, wherein the lens element system is embodied in such a way that in at least one setting an f-number is F≤3, wherein the lens element system is furthermore embodied in such a way that an actuation of the actuating element brings about a movement of two optical elements relative to one another, such that an intersection length difference of the lens element system can be set.

As has already been explained above, in this context "intersection length difference" should be understood to be the intersection length difference in the longitudinal direction, i.e. parallel to an optical axis of the lens element system. In particular, it may be provided that the intersection length difference can be set for a beam of rays having a specific distance h from an optical axis of the lens element system. In this way, it is possible to influence a profile of the intersection length difference over the distance h or the aperture aberration over the distance h in such a way that this is as small as possible overall. However, residual aberrations, so-called zone aberrations, remain in this case. In order to keep them as small as possible, it may in this case be provided, in particular, that the distance h for which the aperture aberration is compensated for corresponds to a distance of the marginal ray in the case of a maximally open stop or in the case of the smallest f-number of the lens or in the case of half the maximum aperture of the stop. In particular, however, the aperture aberration can also be corrected by means of optical elements having aspherical surfaces, which enables compensation of the aperture aberration over the entire distance range h.

In particular, by means of the actuating element it is possible that the intersection length difference of the lens element system can be set in a targeted manner. A change in the intersection length cannot be performed in a targeted manner in the case of known lenses for cameras. Although it can happen that the intersection length or an aperture aberration of a lens is varied by setting other optical parameters of the lens, an actuating element with which the intersection length or the aperture aberration allowed for by the lens can be set in a targeted manner is not known. However, this also enables a layperson to adapt the lens to a specific type of camera. The actuating element can be provided as a ring element, for example, which is rotatable about an optical axis of the lens. However, the actuating element can, for example, also be configured as a slide displaceable parallel to the optical axis of the lens. The mechanisms that convert the movement of the actuating element into a corresponding movement of the two optical elements relative to one another are known in principle to the person skilled in the art. In particular, therefore, an intersection length difference of a beam of light rays of the lens element system that emerges from the lens can be set by means of the actuating element. Consequently, the beam of rays emerging from the lens generally also has a negative aperture aberration; the latter is then compensated for upon passage through the plane-parallel filter element of the camera. The extent of this negative aperture aberration of the emerging beam of rays that is allowed for by the lens can be set in a targeted manner by means of the actuating element. In this case, the actuating element can be moveable continuously or in discrete steps.

A further crucial advantage of the lens proposed in accordance with the first aspect is that, on account of the targeted settability of the aperture aberration or the intersection length difference of the lens element system of the lens, a soft-focus effect can also be brought about in a targeted manner by means of the lens proposed. Of course, by means of the actuating element the intention is firstly to enable a user to be able to use the lens with different camera types and filter thicknesses. Accordingly, a marking for a respective camera type can be provided, for example, on a scale of the actuating element, such that the user sets the actuating element to the corresponding setting and can thus use the lens with the relevant camera type with a compensated aperture aberration. Furthermore, however, it is thus also possible for a user, in particular a more experienced user, to vary the intersection length difference or the aperture aberration from this compensated position in a targeted manner, and thus to achieve a soft-focusing of the image. In particular, the extent of the soft-focusing can be influenced depending on the movement of the actuating element from the compensated position. This allows greater creative leeway for a user of the camera during image recording and, alongside the variable filter compensation, is a further significant advantage of the lens proposed.

In the technical field of microscopes it is known that cover glasses of different thicknesses are arranged in a beam path between the object to be observed and the user's eye. Said cover glasses are always arranged on the object side of an objective of the microscope. Documents DE 38 12 745 A1, WO 95/02842 A1 and DE 31 13 802 A1 should be mentioned as similar examples. However, the plane-parallel object is arranged on the object side of the objective in all cases. Furthermore, in the technical field of microscopes it is possible to perform, relatively close to the plane-parallel object, a complete correction of the optical aberration caused. In this case, the beam path is then always influenced such that there is the best possible compensation of the aperture aberration already when the beam of rays emerges from the objective. In the problem addressed by the present invention, however, it is not possible to correct an aperture aberration already present for a beam of rays on the image side of the element causing the aperture aberration, since there is not enough space between the filters of the camera and the image sensor or the film. By comparison with compensation of an aperture aberration already present by means of different cover glass thicknesses on the object side of the objective, the concept according to the invention is, by means of an actuating element, to bring about and allow for a specific aperture aberration in a targeted manner in order to avoid problems caused by filters on the image side of the lens in connection with the aperture aberration. Soft-focus effects are also generally undesired in the technical field of microscopes and, consequently, are also intended precisely not to be able to be brought about. These different problems addressed and requirements made of the image or the possibilities for setting the image have hitherto prevented solutions known in the technical field of microscopes from being applied to the field of lenses for cameras, more particularly digital cameras, as verified by the documents US 2009/0052064 A1 and DE 100 28 233 A1 cited in the introduction.

The bringing-about of soft-focus effects by means of specific soft-focus lenses is shown by the document DE 198 45 485 A1, for example. An aspherical surface, for example, a specific soft-focus effect is integrated into the lens. Other methods for causing a soft-focus effect are also known, for example stops having multiple openings or surfaces having a multiplicity of spherical depressions. However, these soft-focus lenses are unsuitable for producing a targeted wavefront in order to compensate for a specific filter thickness. Furthermore, in the case of such lenses, together with the extent of the soft-focus effect, another property of the lens element system always changes, too, for instance the focal length thereof. As a user, however, one is not able to vary the aperture aberration in a targeted manner, whilst maintaining the other optical properties, in particular focusing, in order to sensitively set a correction of a specific filter thickness or an extent of a soft-focus effect brought about. Therefore, no suitable solutions to the problem addressed according to the invention can be found in this technical field either.

A second aspect of the invention proposes the use of a lens in accordance with the first aspect of the invention for compensating for an aperture aberration caused by a filter arranged in a camera, more particularly a digital camera, to which the lens is to be applied.

Hence, according to a second aspect of the invention, there is provided a method for compensating for an aperture aberration caused by a filter arranged in a camera, comprising the step of applying a lens to the camera, the lens comprising a housing, an actuating element arranged on the housing, and a lens element system that can be set into a plurality of settings, wherein the lens element system is embodied in such a way that in at least one setting an f-number is F≤3, wherein the lens element system is furthermore embodied in such a way that an actuation of the actuating element brings about a movement of two optical elements relative to one another, such that an intersection length difference of the lens element system can be set.

In particular, the use can furthermore be provided for, in particular targeted, setting of a soft-focus effect.

The method in accordance with the second aspect of the invention has the same advantages as the lens in accordance with the first aspect of the invention.

In one refinement of the invention it is provided that an actuation of the actuating element brings about a movement of the two optical elements relative to one another parallel to an optical axis of the lens element system.

This refinement of the invention makes it possible, in particular, to provide the two optical elements by means of two lens elements of the lens element system that are displaceable parallel to the optical axis. Furthermore, in the case of a configuration of the actuating element as a slide displaceable parallel to the optical axis, a particularly simple conversion of the movement of the actuating element to the two optical elements can be effected.

In a further refinement it is provided that the two optical elements are formed by two adjacent lens elements of the lens element system, wherein an actuation of the actuating element brings about a change in an air clearance between the two adjacent lens elements.

The variation of an air clearance between two lens elements forming the two optical elements enables a fine and sensitive setting of the intersection length difference or of the aperture aberration allowed for. Through suitable choice of radii, said air clearance is provided, in particular, in such a way that its variation has the greatest possible influence on the aperture aberration of the lens, but has the smallest possible influence on other optical properties of the lens, such as focusing, for example.

In a further refinement of the invention it is provided that the lens element system has a focusing lens element group, wherein the two optical elements are formed by two adjacent lens elements of the focusing lens element group.

Within the focusing lens element group, a movement of individual lens elements parallel to the optical axis of the lens element system is provided anyway. The arrangement of the two optical elements within said focusing lens element group can therefore simplify the mechanism to be provided overall for bringing about lens element movements. In particular, it may be provided that one optical element or one lens element of the two optical elements or of the two adjacent lens elements of the focusing lens element group is moveable in such a way that its position influences both the intersection length difference and the focusing. The other of the two optical elements or the other of the two adjacent lens elements is then moveable in such a way that substantially only the intersection length difference or the aperture aberration but not the focusing is influenced. It thus becomes possible for a user to set the intersection length difference whilst maintaining the focusing or to compensate again for a change in the focusing that is caused by a change in the intersection length difference.

In a further refinement it is provided that the focusing lens element group has four lens elements, in particular having the following data:

| Surface No. | Radius [mm] | Thickness [mm] | Type of glass |
| --- | --- | --- | --- |
| 1' | 143.300000 | 4.000000 | NSF10 |
| 2' | 0.000000 | 6.052053 | |
| 3' | −55.831000 | 3.300000 | NLASF44 |
| 4' | −124.090000 | 0.682471 | |
| 5' | 43.714000 | 4.200000 | NLASF44 |
| 6' | 33.497000 | 6.277940 | |
| 7' | 50.481000 | 9.700000 | NSF1 |
| 8' | −311.710000 | — | |

In this case, the surface No. 1' corresponds to the surface No. 10 illustrated in FIG. 4. The further indications are given in the form that is customary for the person skilled in the art. Convex radii are indicated as positive, and concave radii as negative. All indications are in millimeters. The distance with respect to the subsequent surface is respectively indicated in the column "Thickness". The material properties of the types of glass indicated are known to the person skilled in the art, in particular the respective refractive index and the respective Abbe number, and are furthermore evident from the table indicated below.

The focusing lens element group described above provides particularly well a possibility for varying the aperture aberration or the intersection length difference, by varying in particular a distance between the lens element having the surfaces Nos. 5' and 6' and the lens element having the surfaces Nos. 7' and 8', that is to say the thickness indicated under 6', as is illustrated in the diagram in FIG. 5a. For simultaneously influencing a focusing, the four lens elements of the focusing lens element group are moved or displaced jointly.

In a further refinement it is provided that the lens element system has the following data:

| Surface No. | Radius [mm] | Thickness [mm] | Type of glass |
| --- | --- | --- | --- |
| 1 | 90.116205 | 5.300000 | SPHM52 |
| 2 | 34.724000 | 21.419365 | |
| 3 | 120.570000 | 5.000000 | SFPL51 |
| 4 | 25.852000 | 11.707684 | |
| 5 | 220.670000 | 3.000000 | NSF57HT |
| 6 | 34.724000 | 11.951096 | |
| 7 | −44.668000 | 2.500000 | SFPL53 |
| 8 | 38.404000 | 16.100000 | NSK16 |
| 9 | −44.668000 | 2.500000 | |
| 10 | 143.300000 | 4.000000 | NSF10 |
| 11 | 0.000000 | 6.052053 | |
| 12 | −55.831000 | 3.300000 | NLASF44 |
| 13 | −124.090000 | 0.682471 | |
| 14 | 43.714000 | 4.200000 | NLASF44 |
| 15 | 33.497000 | 6.277940 | |
| 16 | 50.481000 | 9.700000 | NSF1 |
| 17 | −311.710000 | 17.211876 | |
| 18 | 0.000000 | 2.000000 | — |
| 19 | 116.310000 | 14.100000 | SFPL51 |
| 20 | −48.348000 | 0.300000 | |

-continued

| Surface No. | Radius [mm] | Thickness [mm] | Type of glass |
|---|---|---|---|
| 21 | −183.481769 | 2.700000 | SLAH53 |
| 22 | 34.227000 | 1.921019 | |
| 23 | 42.474000 | 13.500000 | SFPL53 |
| 24 | −33.497000 | 0.300000 | |
| 25 | −530.880000 | 2.200000 | NLASF40 |
| 26 | 32.313000 | 11.500000 | SFPL53 |
| 27 | −58.294000 | 4.205019 | |
| 28 | 97.163000 | 11.800000 | SFPL51 |
| 29 | −34.724000 | 0.000000 | |
| 30 | 0.000000 | 36.397422 | — |

All indications are in millimeters. A radius of "0.000000" denotes here a plane surface or a stop; in some instances the indication "infinite" is also used here, and could likewise be indicated. This nomenclature is familiar to the person of average skill in the art. The data apply to an object situated at infinity. The thickness of the surface 30 correspondingly indicates the distance with respect to the image plane. The surfaces 1 and 21 are embodied as aspherical surfaces. The aspherical surfaces are respectively described by the following asphere formula:

$$P(h) = \frac{(1/r) \cdot h^2}{1 + \sqrt{1 - (1+K)(1/r)^2 h^2}} + c_1 h^4 + c_2 h^6 + \ldots$$

All indications are in millimeters. A radius of "0.000000" denotes here a plane surface or a stop; in some instances the indication "infinite" is also used here, and could likewise be indicated. This nomenclature is familiar to the person of average skill in the art. The data apply to an object situated at infinity. The thickness of the surface 30 correspondingly indicates the distance with respect to the image plane. The surfaces 1 and 21 are embodied as aspherical surfaces. The aspherical surfaces are respectively described by the following asphere formula:

$$P(h) = \frac{(1/r) \cdot h^2}{1 + \sqrt{1 - (1+K)(1/r)^2 h^2}} + c_1 h^4 + c_2 h^6 + \ldots$$

Aspheric Surface No. 1:
Asphere type: conical constant:
CSA 0.000000000E+00
Asphere Constants:
$c_1$=2.138410558E-06
$c_2$=−7.813837178E-10
$c_3$=1.267806896E-12
$c_4$=−1.341503588E-15
$c_5$=9.878056126E-19
$c_6$=−3.869146575E-22
$c_7$=6.576152649E-26
Aspheric Surface No. 21:
Asphere type: conical constant:
CSA 0.000000000E+00
Asphere Constants:
$c_1$=−1.002414545E-05
$c_2$=5.931864360E-10
$c_3$=7.136430627E-12

For the compensation of an aperture aberration or for influencing the intersection length difference, the thickness indicated under 15 is changed. In particular, this is done in the manner as illustrated in FIG. 5a; the thickness indicated there should be added to the value indicated under 15. In particular, the thickness of the surface 17 then correspondingly decreases. The values for the thicknesses indicated for the surfaces 1 to 30 thus hold true for a filter thickness of 0 mm.

In order to compensate for the defocusing caused by the change in the thickness 15, the surfaces 10 to 17 are displaced jointly, as is illustrated in FIG. 5b. In this case, the thickness 9 correspondingly increases by the value to be added from the diagram in FIG. 5b, and the thickness of the surface 17 correspondingly decreases. The data indicated apply to an object situated at infinity. The thickness of the surface 30 indicates the distance with respect to the image plane.

This lens element system has the focusing lens element group described in the preceding configuration and overall provides particularly good optical properties.

In a further refinement of the invention it is provided that the lens element system is furthermore embodied in such a way that an actuation of the actuating element brings about a change in a focal length of the lens element system, such that a change in the focal length brought about by a change in the intersection length difference is compensated for.

In this way, an automatic adaptation of the focusing is brought about when there is a change in the intersection length difference or in the aperture aberration. In particular, the defocusing that arises when the aperture aberration is set is thus automatically compensated for.

In a further refinement of the invention, which refinement is combinable with all other refinements, it can be provided that the lens element system is further configured such that an actuation of the actuating element does not cause a change of the remaining optical properties, in particular focusing and f-number, of the lens.

By this, a change of the intersection length can be caused without influencing the remaining optical properties and the captured picture. Hence, a need to readjust the lens to compensate for changes caused can be avoided.

In a further refinement it is provided that the lens element system has a third lens element group arranged on the image side of an aperture stop, wherein the two optical elements are formed by two adjacent lens elements of the third lens element group, and wherein a lens element of the adjacent lens elements that is arranged on the image side is an aspheric lens element.

By means of an aspheric lens element, the aperture aberration can be corrected particularly well for all distances with respect to the optical axis. In particular, the form of the aspheric lens element can be embodied in such a way that in the case of a variation of an air gap between that lens element of the adjacent lens elements which is arranged on the image side and that lens element of the adjacent lens elements which is arranged on the object side, only the aperture aberration of the lens element system is influenced. In particular, it can furthermore be provided that a lens element of the adjacent lens elements which is arranged on the object side is arranged directly on the image side of an aperture stop. That means that no further optical elements, in particular lens elements, are situated between that lens element of the adjacent lens elements which is arranged on the object side and the aperture stop.

In a further refinement it can be provided that the aspheric lens element is an aspheric cemented element, in particular having the following data:

| Surface No. | Radius [mm] | Thickness [mm] | Type of glass |
|---|---|---|---|
| 1' | −200.648147 | 3.600000 | SLAH53 |
| 2' | 34.294956 | 12.905203 | SFPL53 |
| 3' | −48.773904 | | |

Aspheric Surface No. 1':
Asphere type: conical constant:
CSA 0.000000000E+00
Asphere Constants:
$c_1 = -5.280909907\text{E}-06$
$c_2 = 1.504667518\text{E}-09$
$c_3 = -8.408238291\text{E}-13$
$c_4 = 8.471013661\text{E}-16$ The surface No. 1' corresponds to the surface No. 17 in FIG. 6. The surfaces Nos. 2' and 3' correspond to the surfaces Nos. 18 and 19, respectively. All indications in this and in other representations are in millimeters.

The cementing of the aspheric lens enables a robust design with high imaging performance, particularly since reflections at an air gap are avoided.

In a further refinement it is provided that the lens element system has the following data:

| Surface No. | Radius [mm] | Thickness [mm] | Type of glass |
|---|---|---|---|
| 1 | 180.119729 | 6.500000 | SPHM52 |
| 2 | 38.688375 | 20.002248 | |
| 3 | 171.010743 | 5.000000 | SFPL51 |
| 4 | 36.946638 | 8.836063 | |
| 5 | 77.611721 | 4.500000 | NSF57HT |
| 6 | 32.107934 | 15.773184 | |
| 7 | −43.084941 | 4.400000 | SFPL53 |
| 8 | 43.075059 | 16.399791 | NSK16 |
| 9 | −54.554119 | 10.988557 | |
| 10 | 52.586703 | 3.700000 | NLASF44 |
| 11 | 35.893774 | 12.496658 | |
| 12 | 56.108740 | 8.641316 | NSF1 |
| 13 | 0.000000 | 26.631826 | |
| 14 | 0.000000 | 11.683115 | — |
| 15 | 61.705916 | 11.114398 | SFPL51 |
| 16 | −70.026143 | 1.631465 | |
| 17 | −200.648147 | 3.600000 | SLAH53 |
| 18 | 34.294956 | 12.905203 | SFPL53 |
| 19 | −48.773904 | 0.300000 | |
| 20 | −1634.003859 | 3.700000 | NLASF40 |
| 21 | 43.330919 | 10.819207 | SFPL53 |
| 22 | −84.305387 | 0.100000 | |
| 23 | 63.360404 | 11.621284 | SFPL51 |
| 24 | −44.079624 | 0.000000 | |
| 25 | 0.000000 | 35.553756 | — |

In this case, the surfaces 1 and 17 are embodied as aspheric surfaces and are described by the following data:
Aspheric Surface No. 1:
Asphere type: conical constant:
CSA 0.000000000E+00
Asphere Constants:
$c_1 = 2.037022717\text{E}-06$
$c_2 = -5.369449900\text{E}-10$
$c_3 = 1.625392430\text{E}-13$
$c_4 = -1.343471905\text{E}-17$
Aspheric Surface No. 17:
Asphere type: conical constant:
CSA 0.000000000E+00
Asphere Constants:
$c_1 = -5.280909907\text{E}-06$
$c_2 = 1.504667518\text{E}-09$
$c_3 = -8.408238291\text{E}-13$
$c_4 = 8.471013661\text{E}-16$ For the compensation of an aperture aberration or for influencing the intersection length difference, the thickness indicated under 16 is changed. In particular, this is done in the manner as illustrated in FIG. 7; the thickness indicated there should be added to the value indicated under 16. In particular, the thickness of the surface 19 then correspondingly decreases. The values for the thicknesses indicated for the surfaces 1 to 25 thus hold true for a filter thickness of 0 mm. For setting a focusing, the surfaces 10 to 13 are displaced jointly; in this case, the thickness of the surface 9 correspondingly increases and the thickness of the surface 14 decreases. The data apply to an object situated at infinity. The thickness of the surface 25 correspondingly indicates the distance with respect to the image plane.

This refinement provides a particularly good setting of the intersection length difference or of the aperture aberration over all distances h and at the same time makes it possible to sensitively set the intersection length difference or the aperture aberration to be allowed for, without influencing other optical properties of the lens element system; in particular, the focusing remains unaffected.

In a further refinement it is provided that an actuation of the actuating element brings about a movement of the two optical elements relative to one another perpendicular to an optical axis of the lens element system.

This refinement can be advantageous particularly when, adjacent to the two optical elements in the direction of the optical axis of the lens element system, there is only little structural space available for their movement. The configuration can furthermore generally save axial structural space.

In one refinement it can be provided that the two optical elements are two glass wedge elements bearing against one another by their respective wedge surfaces, said glass wedge elements jointly forming a plane-parallel optical element arranged perpendicular to an optical axis of the lens element system, wherein an actuation of the actuating element brings about a change in a thickness of the plane-parallel optical element, said thickness being parallel to the optical axis.

In this way it becomes possible to change the thickness of the plane-parallel optical element by actuating the actuating element and thus to influence the intersection length difference allowed for by the lens. Since the plane-parallel optical element furthermore does not significantly influence the imaging properties of the lens, a targeted setting of the intersection length difference or of the aperture aberration allowed for can be effected in this way. Furthermore, through a corresponding choice of the wedge angle of the glass wedge elements, it is possible in a particularly simple manner to design the translation by which a specific actuation of the actuating element is converted into a change in the intersection length difference or change in the thickness of the plane-parallel optical element.

In one refinement it can be provided that the lens element system is embodied in such a way as to compensate for a intersection length difference for a maximum settable thickness of the plane-parallel optical element.

Consequently, the lens element system has no aperture aberration if the maximum settable thickness is chosen by means of the actuating element. In particular, this thickness can correspond to the case where no filter at all is provided in the camera, or the thickness of the filter there is zero. In this way, the lens proposed could, for example, also be used with an analogue camera with no filters provided upstream of the film of said analogue camera.

If a filter or a filter bundle is provided in the camera, these generally consist of plates having a different refractive index and thickness. An equivalent glass thickness of the filter bundle can be calculated by means of the formula $(n_1 \cdot d_1 + n_2 \cdot d_2 + \ldots)/n_R = d_R$, which is known per se to the person skilled in the art. By displacing the glass wedge elements relative to one another, it is then possible for the thickness of the plane-parallel optical element formed by the glass wedge elements to be reduced by this equivalent thickness calculated for the filter bundle of the camera. As a result, the lengthening of the intersection length provided by the plane-parallel optical element of the lens is reduced by the lengthening of the intersection length brought about by the filter bundle of the camera. Overall, therefore, a complete compensation of the aperture aberration is again obtained.

In one refinement it can be provided that the two optical elements or the two glass wedge elements form an image-side termination of the lens element system.

By arranging the glass wedge elements in the beam path downstream of the last lens element of the lens element system of the lens, it is possible for the glass wedge elements simultaneously to serve as protection of the last lens element.

The types of glass indicated in all of the exemplary embodiments correspond to the designations of Schott AG, Mainz, Germany and Ohara GmbH, Hofheim, Germany. The glasses can be procured from them with the designations indicated. With regard to the material properties of the types of glass, the values in the table below are applicable. In this case, $n_d$ denotes the refractive index in a medium range of the optical spectrum, namely at the yellow helium line, i.e. 587.5618 nm. As a measure of dispersion, the Abbe number $V_d$ is indicated, which results as $$v_d = \frac{n_d - 1}{n_F - n_C},$$

wherein $n_F$ indicates the refractive index at the blue F line of hydrogen (486.1327 nm) and $n_C$ indicates the refractive index at the red C line of hydrogen (656.2725 nm).

| Type of glass | Refractive index $n_d$ | Abbe number $v_d$ |
| --- | --- | --- |
| SPHM52 | 1.61800 | 63.4 |
| SFPL51 | 1.49700 | 81.6 |
| NSF57HT | 1.84666 | 23.78 |
| SFPL53 | 1.43875 | 95.0 |
| NSK16 | 1.62041 | 60.32 |
| NSF10 | 1.72828 | 28.53 |
| NLASF44 | 1.80420 | 46.50 |
| NSF1 | 1.71736 | 29.62 |
| SLAH53 | 1.80610 | 40.9 |
| NLASF40 | 1.83404 | 37.30 |

It goes without saying that the features mentioned above and those yet to be explained below can be used not only in the combination respectively indicated, but also in other combinations or by themselves, without departing from the scope of the present invention.

BRIEF DESCRIPTION OF THE SEVERAL VIEWS OF THE DRAWING

Exemplary embodiments of the invention are illustrated in the drawing and are explained in greater detail in the description below. In the figures:

FIG. 8 shows a schematic view of yet another embodiment of a lens element system of the lens according to the invention;

FIG. 9a shows a setting of maximum thickness of a plane-parallel optical element formed by two glass wedge elements in the case of the embodiment in FIG. 8; and FIG. 9b shows a setting of reduced thickness of the plane-parallel optical element formed by the glass wedge elements in FIG. 8.

DETAILED DESCRIPTION OF THE INVENTION

Figure 1:
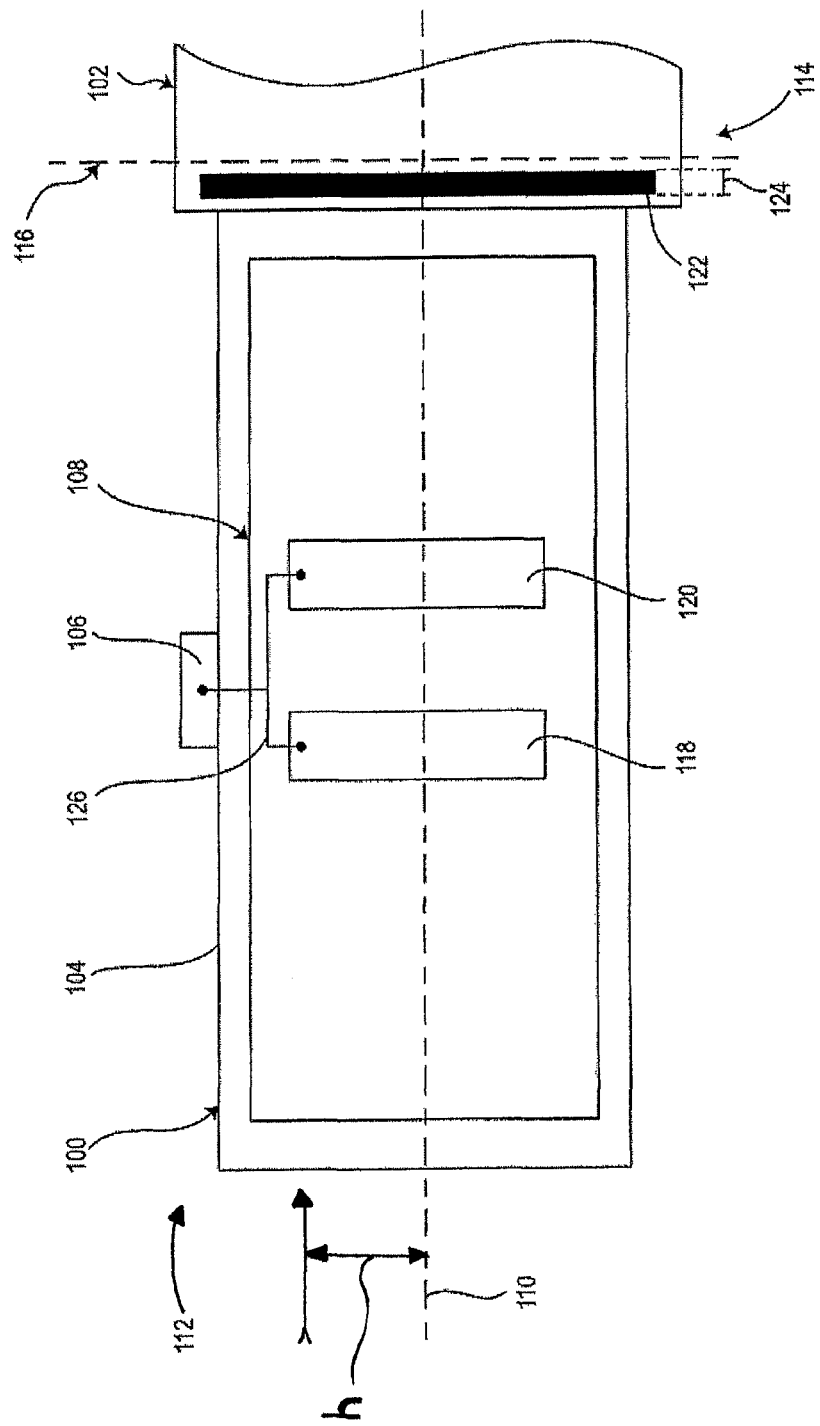
FIG. 1 shows a schematic view of an embodiment of a lens or objective in accordance with a first aspect of the invention.

FIG. 1 shows a schematic embodiment of an objective or lens 100. The lens 100 is provided for being used together with a camera 102, more particularly a digital camera. The lens 100 has a housing 104, on which an actuating element 106 is arranged. The actuating element 106 is merely illustrated schematically in FIG. 1. The actuating element 106 can be, for example, a rotary ring, a rotary knob or else a sliding element. The actuating element 106 can be moveable in discrete steps; preferably, however, the actuating element 106 enables a continuous setting.

Furthermore, the lens 100 comprises a lens element system 108, which is not illustrated in specific detail in the schematic view in FIG. 1. When mention is made hereinafter of a lens element system 108, the latter can also comprise, alongside lens elements, stops identified as separate optical surfaces in the data lists indicated. The lens element system 108 extends along an optical axis 110 of the lens 100. In accordance with its attachment to the camera 102, the lens 100 has an object side 112, which is to be directed at an object to be filmed, and furthermore an image side 114, which faces the camera 102. The lens 100 is intended to generate an image in an image plane 116, in which accordingly a film is arranged in the case of an analogue camera or a corresponding image sensor is arranged in the case of a digital camera. The light therefore moves through the lens 100 in the direction of the image plane 116 or the corresponding image sensor. In other words, the light is incident from the object side 112 in the direction of the image side 114 through the lens 100.

The lens element system 108 comprises a first optical element 118 and a second optical element 120, which are moveable relative to one another by means of the actuating element 106. The first optical element 118 and the second optical element 120 form the "two optical elements" within the meaning of the invention. By means of an actuation of the actuating element 106, a movement of the two optical elements 118, 120 relative to one another is brought about, such that an intersection length difference of the lens element system 108 can be set.

The setting of the intersection length difference or of the aperture aberration present at an image-side end of the lens, which setting can be performed in a targeted manner by means of the actuating element 106, serves to allow for an aperture aberration caused by a filter 122 of the camera 102. Since the filter 122 is situated in a convergent beam path, it generates a positive intersection length difference, such that a negative intersection length difference should correspondingly be allowed for at an image-side end of the lens 100. An extent of the negative intersection length difference to be allowed for or of the negative aperture aberration to be allowed for is dependent on a filter thickness 124 of the filter 122.

In order to be able to correspondingly move the two optical elements 118, 120 relative to one another, the lens comprises an actuating mechanism 126, which converts an actuation of the actuating element 106 into a corresponding movement of the two optical elements 118, 120 relative to one another. The configuration of such an actuating mechanism is known in principle to the person skilled in the art and is not described in greater detail below. This applies to all of the embodiments, whether the optical elements 118, 120 be moved relative to one another parallel to the optical axis 110 or perpendicular to the optical axis 110.

Alongside the actuating element 106 illustrated, the lens 100 also has further actuating elements, which are not illustrated in specific detail in the schematic view in FIG. 1. Said elements can be provided, for example, for setting an aperture of an aperture stop or for setting a focal length of the lens element system 108. The lens element system 108 is embodied in such a way that an f-number F≤3 can be set.

Figure 2:
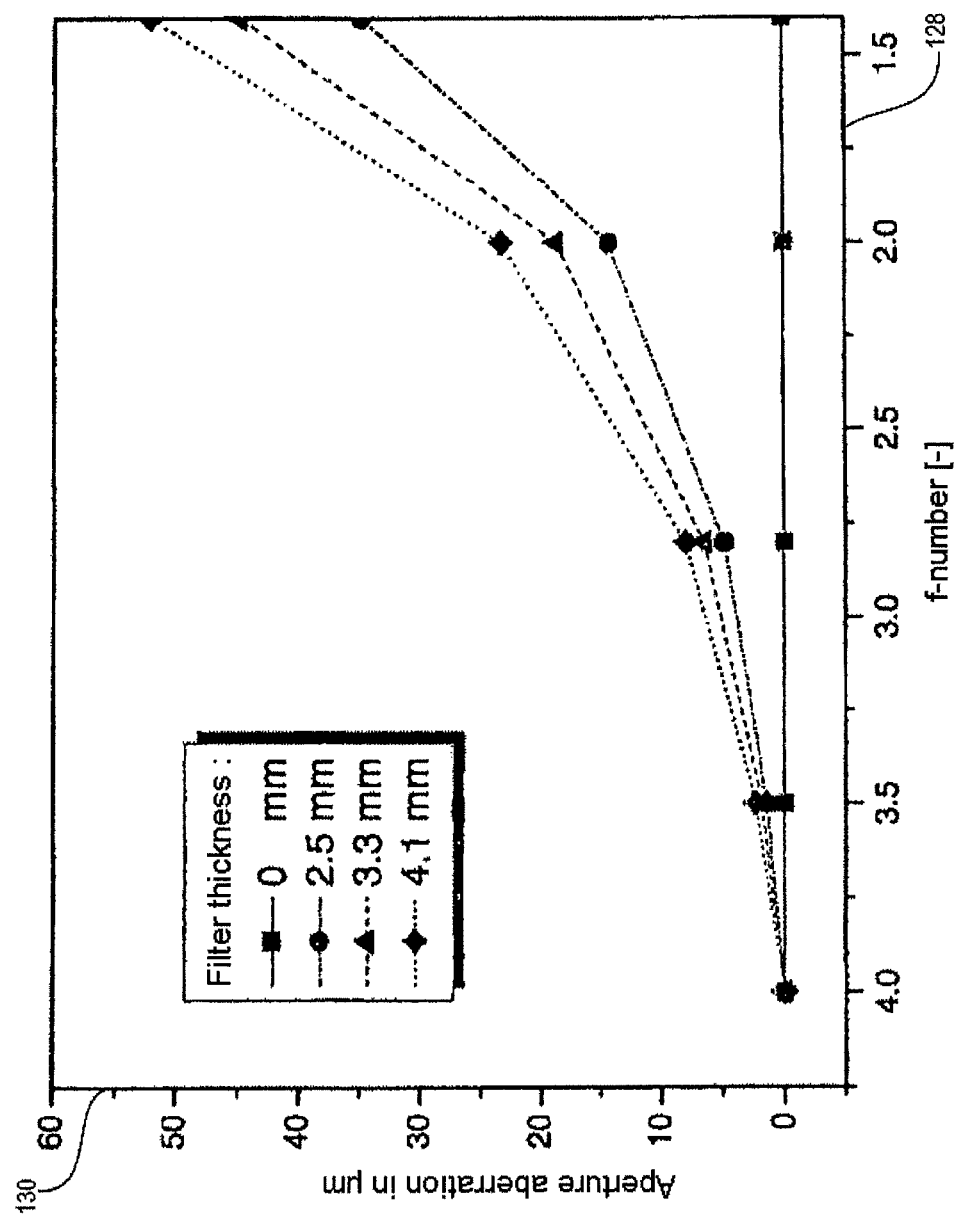
FIG. 2 shows by way of example a diagram describing an aperture aberration as a function of an f-number and a filter thickness of a camera.

FIG. 2 shows a diagram for elucidating a profile of an aperture aberration as a function of an f-number and a filter thickness of the filter 124. In this case, the f-number is plotted along an x-axis 128 and the aperture aberration is plotted along a y-axis 130. As can be discerned, for the case where no filter is provided, the aperture aberration is compensated for over all f-numbers. If filters 122 having different filter thicknesses 124 are then situated in the camera 102, a lengthening of the intersection length and thus a positive aperture aberration are correspondingly present. The thicker the filter thickness 124, the greater the aperture aberration in this case. Furthermore, the aperture aberration is dependent on the f-number. The smaller the f-number, i.e. the larger the aperture of a stop provided in the lens, the further the distance h between a marginal impinging light ray and the optical axis 110. (See FIG. 1). As the distance h increases, the aperture aberration then also increases. As can readily be discerned in FIG. 2, the size of the aperture aberration increases more than proportionally to the aperture of the stop. It can be discerned that, in the case of an f-number F≤3, the aperture aberration assumes a significant absolute value. It thus becomes clear that differences in the filter thickness of different camera types for high-aperture lenses can undesirably result in a reduction of the image sharpness or, in the case of digital cameras, a loss of resolution. The aperture aberrations indicated can be compensated for by means of the lens 100 proposed. In particular, it can be provided that aperture aberrations up to approximately 100 μm can be compensated for by means of the lens 100.

Figure 3:
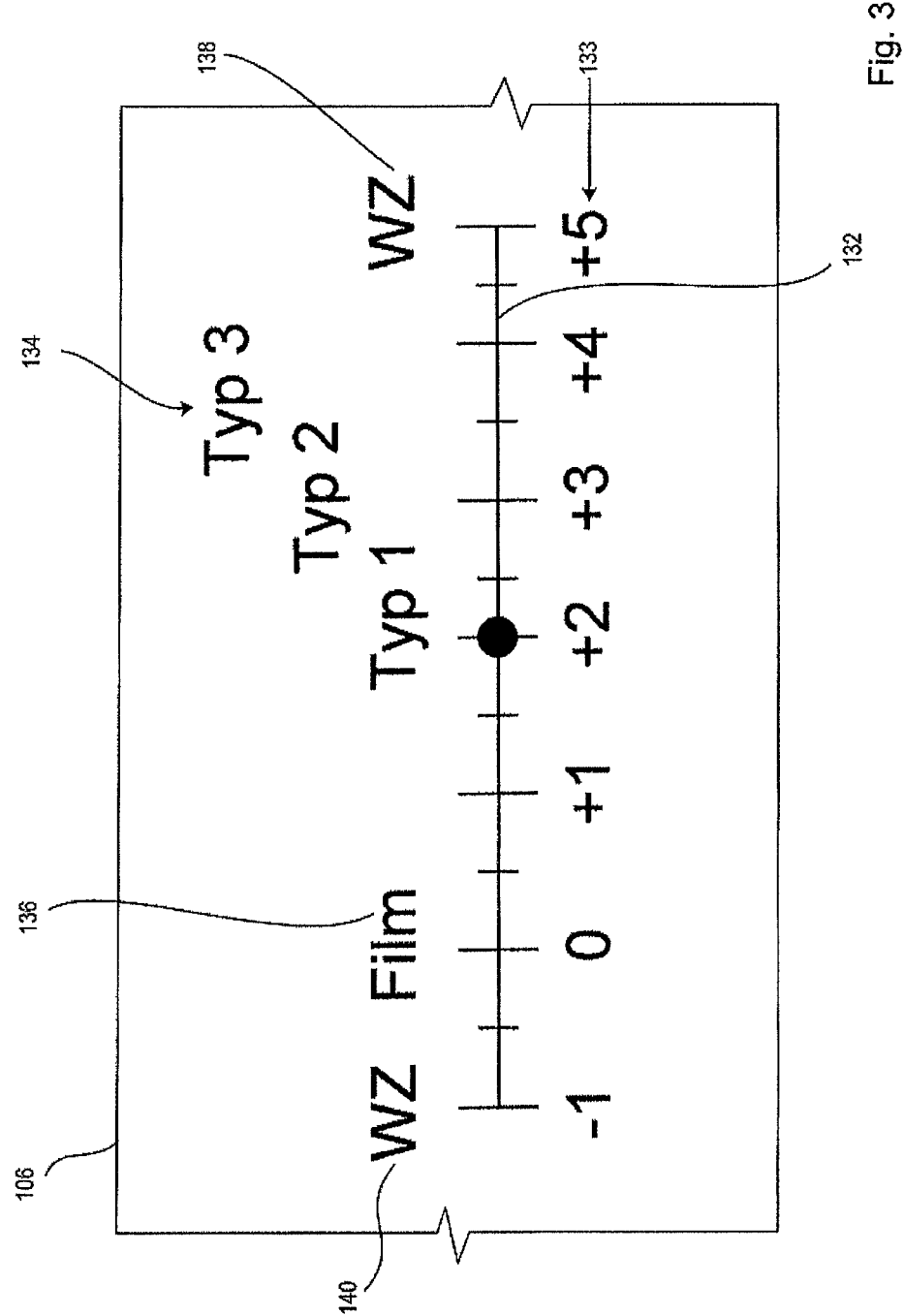
FIG. 3 shows an embodiment of an actuating element.

FIG. 3 shows a possible configuration of an actuating element 106. A scale 132 is provided on the actuating element 106, on which scale 132 the filter thickness 124 is indicated in mm by means of a plurality of numerical values 133. In this case, a setting "zero" corresponds to no filter 122 provided, which can be the case, for example, in an analogue camera. Since the filter thickness of a specific camera type is often not known to a user, the scale can indicate a plurality of type designations 134, which correspond to a specific numerical value 133 on the basis of the position, such that the user merely has to search for the camera type on the actuating element 106 and can then perform a corresponding filter thickness setting. A further designation "film" 136 can indicate the setting for a camera without an attached filter. What is important is that, beyond a filter thickness 124 of "zero" or the setting 136, a setting into the negative range can also be performed by means of the actuating element 106. Furthermore, beyond the largest possible setting of a filter thickness for a specific camera type, the actuating element 106 and thus the intersection length difference can also be set even further for larger filter thicknesses. These settings beyond the settings necessary for specific camera types serve for bringing about a soft-focus effect in a desired manner. Corresponding designations 138, 140 can be provided on the actuating element 106. The designation "WZ" but also the other designations entered in FIG. 3 are intended for the German-speaking area; other designations are also conceivable for countries where correspondingly different languages are spoken. By means of the actuating element 106, it is also possible for a user, without great operating experience, to set the lens to a specific camera type or to use the lens 100 with different camera types. This is significantly facilitated by the type designations 134. Proceeding from such a compensated setting, the actuating element 106 or the lens 100 furthermore affords the possibility for a more experienced user to influence the intersection length difference or the aperture aberration in a targeted manner, in order to bring about a soft-focus effect in the image in a desired manner.

Figure 4:
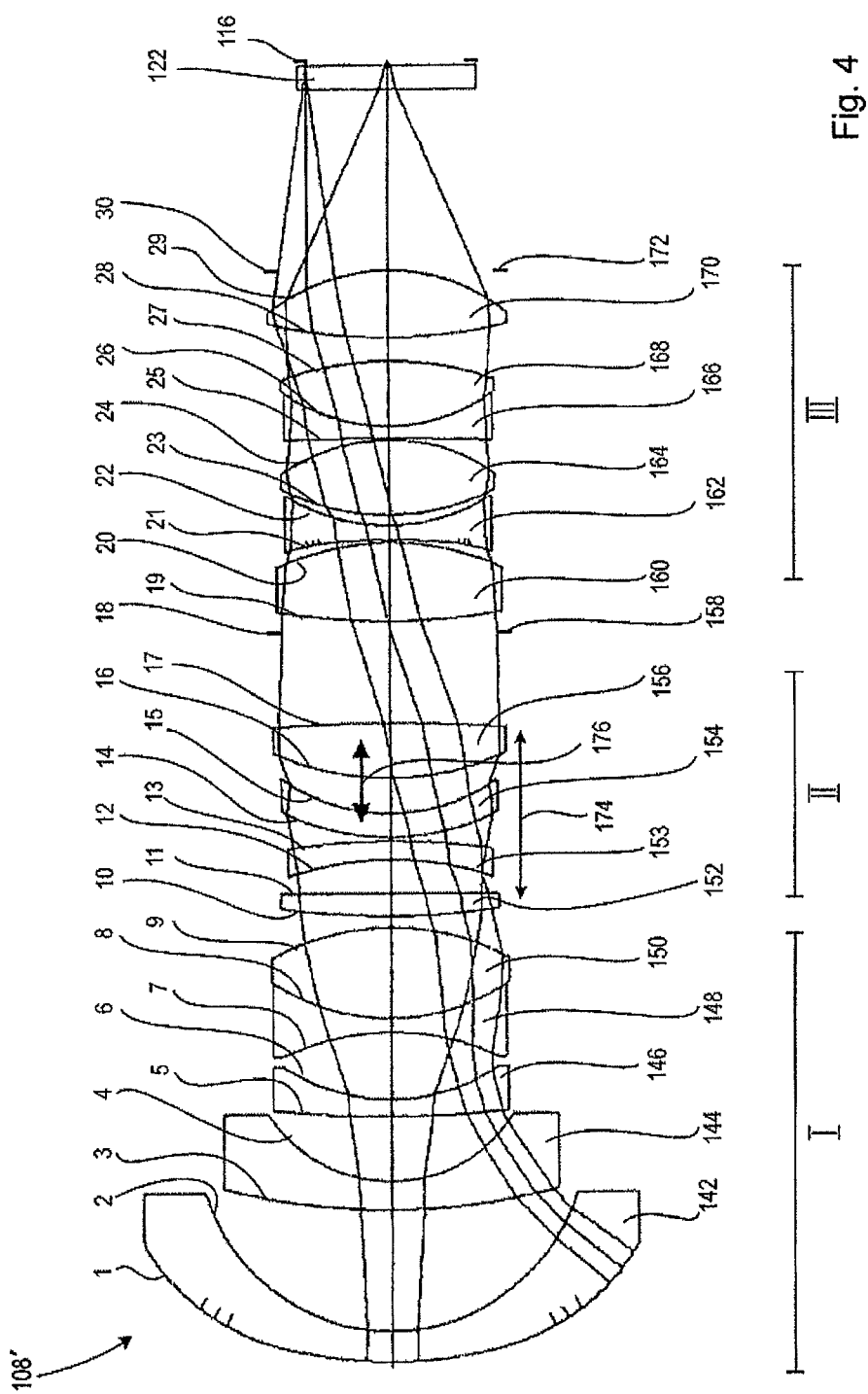
FIG. 4 shows an embodiment of a lens element system for a lens according to the invention.

FIG. 4 shows an embodiment of a lens element system 108' that can be used, for example, in the lens according to FIG. 1. The lens element system 108' comprises a first lens element group I having five lens elements 142 to 150. The lens elements 148 and 150 are cemented. Furthermore, a focusing lens element group II is provided, having four lens elements 152, 153, 154 and 156. An aperture stop of the lens element system 108' is designated by 158. A third lens element group III having six lens elements 160 to 170 is arranged in the beam path downstream of the aperture stop 158. The lens elements 166 and 168 are cemented. An image-side end of the lens element system 108' is designated by a plane 172.

The data for the surfaces of the lens elements and stops 142 to 172 are designated by the numbers 1 to 30, the exact data emerging from the table below, which hold true for a filter thickness of 0 mm:

| Surface No. | Radius [mm] | Thickness [mm] | Type of glass |
| --- | --- | --- | --- |
| 1 | 90.116205 | 5.300000 | SPHM52 |
| 2 | 34.724000 | 21.419365 | |
| 3 | 120.570000 | 5.000000 | SFPL51 |
| 4 | 25.852000 | 11.707684 | |
| 5 | 220.670000 | 3.000000 | NSF57HT |
| 6 | 34.724000 | 11.951096 | |
| 7 | −44.668000 | 2.500000 | SFPL53 |
| 8 | 38.404000 | 16.100000 | NSK16 |
| 9 | −44.668000 | 2.500000 | |
| 10 | 143.300000 | 4.000000 | NSF10 |
| 11 | 0.000000 | 6.052053 | |
| 12 | −55.831000 | 3.300000 | NLASF44 |
| 13 | −124.090000 | 0.682471 | |

-continued

| Surface No. | Radius [mm] | Thickness [mm] | Type of glass |
|---|---|---|---|
| 14 | 43.714000 | 4.200000 | NLASF44 |
| 15 | 33.497000 | 6.277940 | |
| 16 | 50.481000 | 9.700000 | NSF1 |
| 17 | −311.710000 | 17.211876 | |
| 18 | 0.000000 | 2.000000 | — |
| 19 | 116.310000 | 14.100000 | SFPL51 |
| 20 | −48.348000 | 0.300000 | |
| 21 | −183.481769 | 2.700000 | SLAH53 |
| 22 | 34.227000 | 1.921019 | |
| 23 | 42.474000 | 13.500000 | SFPL53 |
| 24 | −33.497000 | 0.300000 | |
| 25 | −530.880000 | 2.200000 | NLASF40 |
| 26 | 32.313000 | 11.500000 | SFPL53 |
| 27 | −58.294000 | 4.205019 | |
| 28 | 97.163000 | 11.800000 | SFPL51 |
| 29 | −34.724000 | 0.000000 | |
| 30 | 0.000000 | 36.397422 | — |

Aspheric Surface No. 1:
Asphere type: conical constant:
CSA 0.000000000E+00
Asphere Constants:
$c_1$=2.138410558E-06
$c_2$=−7.813837178E-10
$c_3$=1.267806896E-12
$c_4$=−1.341503588E-15
$c_5$=9.878056126E-19
$c_6$=−3.869146575E-22
$c_7$=6.576152649E-26
Aspheric Surface No. 21:
Asphere type: conical constant:
CSA 0.000000000E+00
Asphere Constants:
$c_1$=−1.002414545E-05
$c_2$=5.931864360E-10
$c_3$=7.136430627E-12

The lens elements 152 to 156 or the lens element group II can be varied along a focus distance 174. An air clearance or a compensation distance 176 can be varied between the lens element 154 and the lens element 156; air clearance is the thickness indicated under the surface 15. A variation of the compensation distance 176 serves to influence the intersection length difference or the aperture aberration of the lens system 108' in a targeted manner, whether it be for compensating for the thickness 124 of the filter element 122, such that an aperture aberration no longer arises in the image plane 116, or for bringing about in a desired manner an aperture aberration and an associated soft-focus effect in the image plane 116.

A change in the air clearance or compensation distance 176 is correspondingly possible by means of the actuating element 106. Since a change in the air clearance 176 in the lens element system 108' illustrated also brings about a change in the focusing, an actuation of the actuating element 106 also simultaneously brings about a movement of the lens element group II along the focus distance 174 in order to compensate for said change in focusing. In this case, as is explained below with reference to FIG. 5b, the thickness indicated under the surface 9 increases and the thickness indicated under the surface 17 correspondingly decreases. The lens element system 108' thus enables a user to vary the aperture aberration or the intersection length difference of the lens element system 108' whilst maintaining the focusing.

Figure 5B:
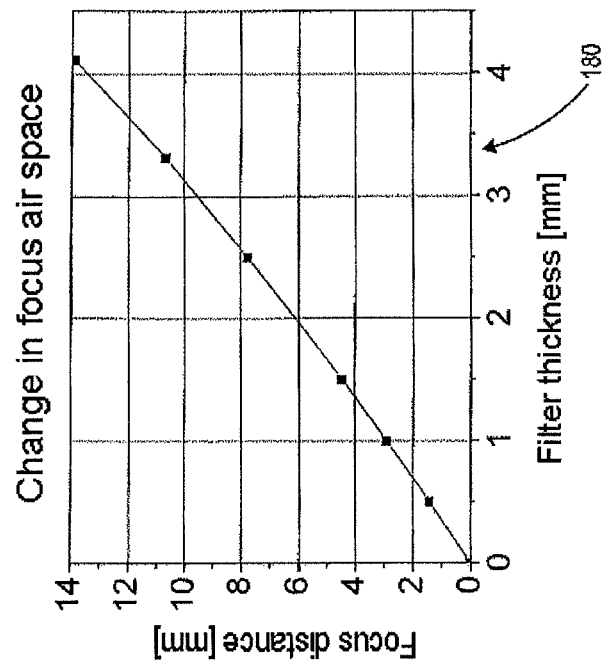
FIG. 5b shows the profile of an air clearance set for the purpose of focusing between two optical elements against the filter thickness set by means of the actuating element in the case of the embodiment in FIG. 4.
Figure 5A:
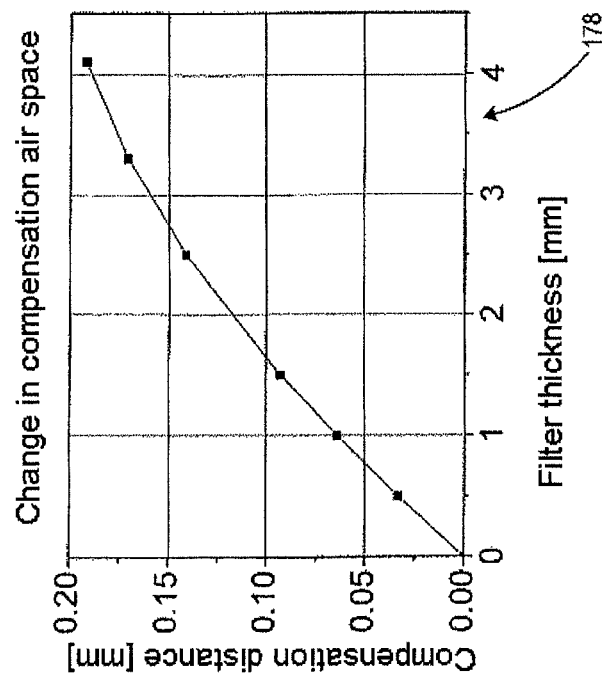
FIG. 5a shows the profile of a compensation distance or of an air clearance against a filter thickness set by means of the actuating element in the case of the embodiment in FIG. 4.

FIG. 5a shows, in a diagram 178, a profile of the compensation distance 176, i.e. the increase in the thickness of the surface 15 and the decrease of the surface 17 as a function of the filter thickness to be compensated for. This profile is plotted against a settable filter thickness of 0 to 4.1 mm. The maximum settable filter thickness can also be greater or less than 4.1 mm. The range going beyond the minimum filter thickness 0 and the maximum provided filter thickness 4.1 for providing a soft-focus effect can be continued, for example, by means of a linear extrapolation of the curve profile illustrated, including into a negative range, thereby reversing the above representation of the increase and decrease in the thicknesses of the surfaces 15 and 17, respectively. The following points are mentioned by way of example for the curve profile: in the case of a filter thickness of 0 the compensation distance is 0, in the case of a filter thickness of 0.5 mm the compensation distance is approximately 0.035 mm, in the case of a filter thickness of 2 mm the compensation distance is approximately 0.145 mm, and in the case of a filter thickness of 4.1 mm the compensation distance is approximately 0.185 mm.

FIG. 5b shows a diagram 180 in which the set focus distance 174, i.e. the increase in the thickness of the surface 9 and respectively the decrease in the thickness of the surface 17, is plotted against the filter thickness. It is evident from this that, for providing the path lengths required in FIGS. 5a and 5b, the lens elements 154 and 156 illustrated in FIG. 4 have to be adjustable relative to one another along the optical axis 110. This can mean that either the lens element 154 or the lens element 156 is moveable parallel to the optical axis 110. In the embodiment illustrated in FIG. 4, the lens element 154 is stationary and the lens element 156 is embodied as moveable.

Exemplary points in the diagram 180 are apparent as follows: in the case of a filter thickness of 0 mm the focus distance is 0 mm, in the case of a filter thickness of 1 mm the focus distance is approximately 3 mm, in the case of a filter thickness of 2 mm the focus distance is approximately 6.1 mm, and in the case of a filter thickness of 4.1 mm the focus distance is approximately 14 mm. To bring about a soft-focus effect in a targeted manner, in a manner corresponding to the compensation distance, the focus distance can also be correspondingly lengthened beyond the limit points for filter thicknesses of 0 mm and 4.1 mm, including into a negative range, thereby reversing in this case, too, the above representation of the increase and decrease in the thicknesses of the surfaces 9 and 17, respectively.

Figure 6:
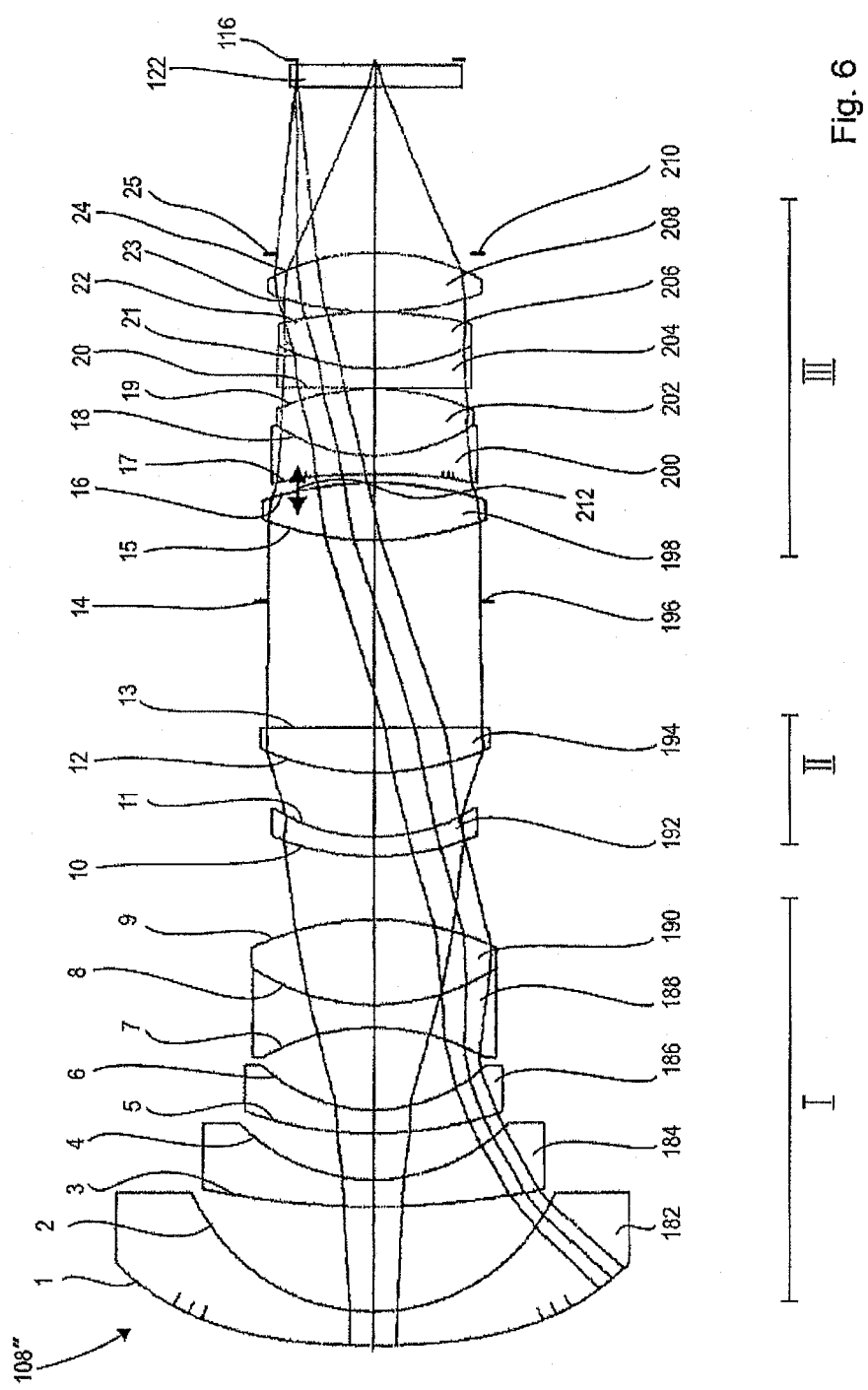
FIG. 6 shows a further embodiment of a lens element system of the lens according to the invention.

FIG. 6 illustrates a further embodiment of a lens element system 108" that can be used in the lens 100. The lens element system 108" comprises a first lens element group I having five lenses 182 to 190, wherein the lens elements 188 and 190 are cemented. Furthermore, a second lens element group II having two lenses 192 and 194 is provided. An aperture stop is designated by the reference sign 196. A third lens element group III having six lens elements 198 to 208 is provided on the image side of the aperture stop 196, wherein the lens elements 200 and 202 and the lens elements 204 and 206 are cemented. An image-side exit plane of the beam of rays from the lens element system 108" is designated by the reference sign 210. The exact data of the surfaces 1 to 25 and of the lens element materials used can be gathered from the table below:

| Surface No. | Radius [mm] | Thickness [mm] | Type of glass |
|---|---|---|---|
| 1 | 180.119729 | 6.500000 | SPHM52 |
| 2 | 38.688375 | 20.002248 | |
| 3 | 171.010743 | 5.000000 | SFPL51 |
| 4 | 36.946638 | 8.836063 | |
| 5 | 77.611721 | 4.500000 | NSF57HT |
| 6 | 32.107934 | 15.773184 | |
| 7 | −43.084941 | 4.400000 | SFPL53 |

-continued

| Surface No. | Radius [mm] | Thickness [mm] | Type of glass |
|---|---|---|---|
| 8 | 43.075059 | 16.399791 | NSK16 |
| 9 | −54.554119 | 10.988557 | |
| 10 | 52.586703 | 3.700000 | NLASF44 |
| 11 | 35.893774 | 12.496658 | |
| 12 | 56.108740 | 8.641316 | NSF1 |
| 13 | 0.000000 | 26.631826 | |
| 14 | 0.000000 | 11.683115 | — |
| 15 | 61.705916 | 11.114398 | SFPL51 |
| 16 | −70.026143 | 1.631465 | |
| 17 | −200.648147 | 3.600000 | SLAH53 |
| 18 | 34.294956 | 12.905203 | SFPL53 |
| 19 | −48.773904 | 0.300000 | |
| 20 | −1634.003859 | 3.700000 | NLASF40 |
| 21 | 43.330919 | 10.819207 | SFPL53 |
| 22 | −84.305387 | 0.100000 | |
| 23 | 63.360404 | 11.621284 | SFPL51 |
| 24 | −44.079624 | 0.000000 | |
| 25 | 0.000000 | 35.553756 | — |

Aspheric Surface No. 1:
Aspheric type: conical constant:
CSA 0.000000000E+00
Asphere Constants:
$c_1 = 2.037022717E-06$
$c_2 = -5.369449900E-10$
$c_3 = 1.625392430E-13$
$c_4 = -1.343471905E-17$
Aspheric Surface No. 17:
Asphere type: conical constant:
CSA 0.000000000E+00
Asphere Constants:
$c_1 = -5.280909907E-06$
$c_2 = 1.504667518E-09$
$c_3 = -8.408238291E-13$
$c_4 = 8.471013661E-16$ As in all of the tables and diagrams, the dimensional indications are given in millimeters. The material properties of the glass materials indicated, in particular the refractive index and the Abbe number, are known to the person skilled in the art on the basis of the material indications.

The lens element system 108" has a lens element 200 within the third lens element group III whose object-side surface is configured in aspherical fashion. The lens element 200 is cemented to the lens element 202. This aspherical cemented element 200, 202 is moveable by means of the actuating element 106, such that an air clearance 212 with respect to an adjacent lens element 198 can be set. The surfaces of the aspherical cemented element are fashioned in such a way that a variation of the air clearance 212 only influences the aperture aberration of the lens element system 108" or the intersection length difference thereof. In principle, either the lens element 198 or the aspherical cemented element 200, 202 can be moveable. In the embodiment in FIG. 6, the aspherical cemented element 200, 202 is moveable. However, it may be advantageous to move the lens element 198 instead of the aspherical cemented element 200, 202, in particular for instance because the weight to be moved of the lens element 198 is less than the weight of the aspherical cemented element 200, 202 or because the thickness of an air gap between the aspherical cemented element 200, 202 and the adjacent lens element 204, 206 does not permit sufficient movement of the aspherical cemented element 200, 202.

Figure 7:
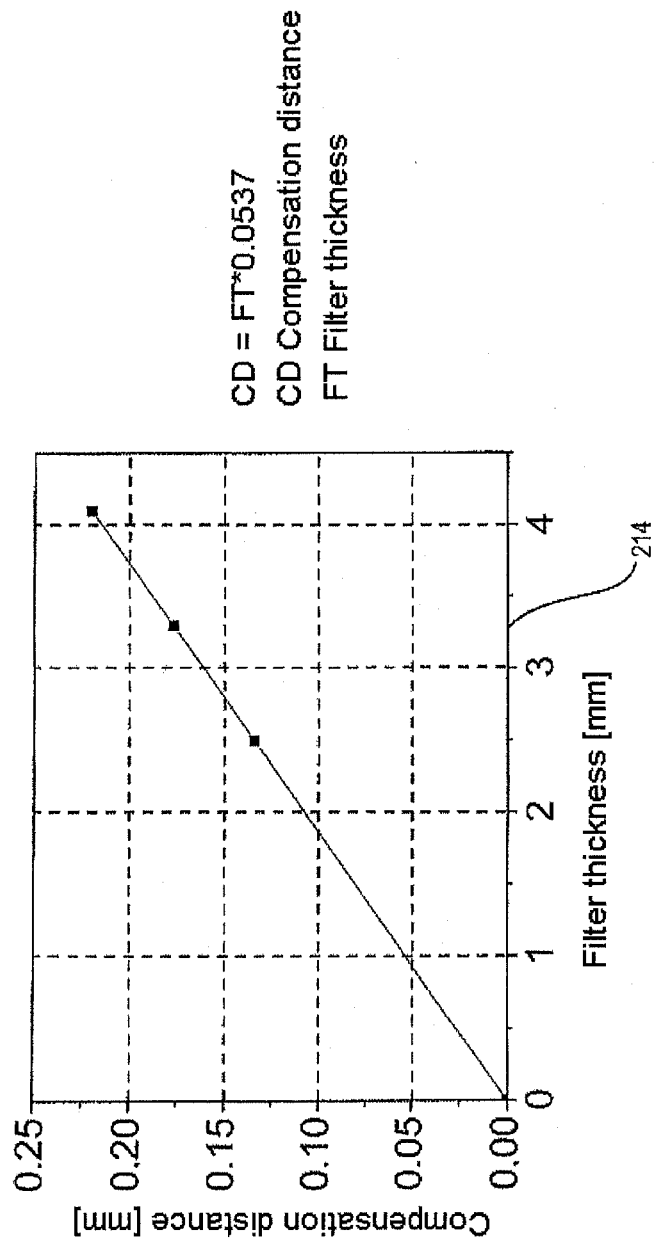
FIG. 7 shows the profile of an air clearance between two optical elements for changing the aperture aberration allowed for against the filter thickness set by means of the actuating element in the case of the embodiment in FIG. 6.

FIG. 7 shows a diagram 214 in which a compensation distance of the aspherical cemented element 200, 202, i.e. the air clearance 212, is plotted against the filter thickness set by means of the actuating element 106. This results in a linear profile of the compensation distance 212 against the filter thickness. The compensation distance or air clearance 212 is equal to the set filter thickness times 0.0537 for the lens element system 108" illustrated in FIG. 6. In order to bring about in a desired manner a soft-focus effect beyond the illustrated limits of 0 mm and 4.1 mm filter thickness, the straight line can be correspondingly extrapolated.

FIG. 8 shows a further embodiment of a lens element system 108''' that can be used in an embodiment of the lens 100'. Identical elements are designated by identical reference signs in FIG. 8 and act in a similar manner. Only the differences are discussed below.

The lens element system 108''' is merely illustrated schematically in FIG. 8. On the image side 114 of the lens element system 108''', the lens element system 108''' terminates with a first glass wedge element 216 and a second glass wedge element 218, which jointly form a plane-parallel optical element 220. A thickness 222 of the plane-parallel optical element 220 can be varied by means of the actuating element 106. A corresponding relative movement of the first glass wedge element 216 and of the second glass wedge element 218 with respect to one another is effected by an actuating mechanism 126', which converts a movement of the actuating element 106 to a corresponding movement of the glass wedge elements 216, 218 relative to one another. The construction of such an actuating mechanism 126' is known in principle to the person skilled in the art and is therefore not described in greater detail. In particular, the plane-parallel optical element 220 terminates the lens element system 108''' on the image side and thus serves to protect the remaining lens elements (not illustrated) of the lens element system 108'''. The plane-parallel optical system 220 is therefore situated at an image-side end 224 of the lens element system 108'''.

FIG. 9a shows a setting of the plane-parallel optical element 220 for which a thickness 222 of the plane-parallel optical element 220 is a maximum. This thickness is provided up to a boundary 226 of the beam of rays passing through the plane-parallel optical element 220. The lens element system 108''' is embodied in such a way that, for this maximum thickness 222, the aperture aberration of the lens element system 108''' is compensated for or the intersection length difference is 0. By displacing the glass wedge elements 216 and 218 relative to one another, it is possible for the thickness 222 now to be altered. In this case, "maximum thickness" should be understood to mean that thickness of the plane-parallel optical element 220 for which the aperture aberration of the lens element system 108''' is compensated for, for a filter thickness of 0 mm. However, it is provided that the thickness 222 can also be increased somewhat within the boundary 226 of the beam of rays, in order to be able to provide a soft-focus effect in a targeted manner proceeding from the "maximum thickness" in both directions, i.e. both by means of positive and by means of negative intersection length difference.

If the glass wedge elements 216, 218 are pulled apart, the thickness 222 decreases to a smaller thickness 222', as is illustrated in FIG. 9b. By means of the actuating element 106, it is thereby possible to reduce the thickness of the plane-parallel optical element 220 by an equivalent glass thickness of the filter 122 of the camera 102. In this way, a negative aperture aberration or a negative intersection length difference is allowed for by the lens 100', such that a positive intersection length difference or a positive aperture aberration caused by the filter 122 in the image plane 116 is ultimately compensated for.

What is claimed is:

1. A lens for a camera, comprising a housing, an actuating element arranged on the housing, and a lens element system that can be set into a plurality of settings, wherein the lens element system is embodied in such a way that in at least one setting an f-number is F≤3, wherein the lens element system is further embodied in such a way that an actuation of the actuating element by a user brings about a movement of two optical elements relative to one another, such that an intersection length difference of the lens element system can be set in a targeted manner.

2. The lens according to claim 1, wherein an actuation of the actuating element brings about a movement of the two optical elements relative to one another parallel to an optical axis of the lens element system.

3. The lens according to claim 1, wherein the two optical elements are formed by two adjacent lens elements of the lens element system, wherein an actuation of the actuating element brings about a change in an air clearance between the two adjacent lens elements.

4. The lens according to claim 1, wherein the lens element system has a focusing lens element group, wherein the two optical elements are formed by two adjacent lens elements of the focusing lens element group.

5. The lens according to claim 1, wherein the movement of the two optical elements relative to one another in response to actuation of the actuating element by the user is independent of changes to the setting of an f-number.

6. A lens for a camera, comprising a housing, an actuating element arranged on the housing, and a lens element s stem that can be set into a plurality of settings wherein the lens element system is embodied in such a way that in at least one setting an f-number is F≤3 wherein the lens element s stem is furthermore embodied in such a way that an actuation of the actuating element brings about a movement of two optical elements relative to one another, such that an intersection length difference of the lens element system can be set, wherein the lens element system is furthermore embodied in such a way that an actuation of the actuating element brings about a change in a focal length of the lens element system, such that a change in the focal length brought about by a change in the intersection length difference is compensated for.

7. A lens for a camera, comprising a housing, an actuating element arranged on the housing, and a lens element s stem that can be set into a plurality of settings, wherein the lens element system is embodied in such a way that in at least one setting an f-number is F≤3, wherein the lens element system is furthermore embodied in such a way that an actuation of the actuating element brings about a movement of two optical elements relative to one another, such that an intersection length difference of the lens element system can be set, wherein the focusing lens element group has four lens elements, in particular having the following data:

| Surface No. | Radius [mm] | Thickness [mm] | Type of glass |
|---|---|---|---|
| 1' | 143.300000 | 4.000000 | NSF10 |
| 2' | 0.000000 | 6.052053 | |
| 3' | −55.831000 | 3.300000 | NLASF44 |
| 4' | −124.090000 | 0.682471 | |
| 5' | 43.714000 | 4.200000 | NLASF44 |
| 6' | 33.497000 | 6.277940 | |
| 7' | 50.481000 | 9.700000 | NSF1 |
| 8' | −311.710000 | — | |

8. The lens according to claim 7, wherein the lens element system has the following data:

Aperture surface: 18

| Surface No. | Radius [mm] | Thickness [mm] | Type of glass |
|---|---|---|---|
| 1 | 90.116205 | 5.300000 | SPHM52 |
| 2 | 34.724000 | 21.419365 | |
| 3 | 120.570000 | 5.000000 | SFPL51 |
| 4 | 25.852000 | 11.707684 | |
| 5 | 220.670000 | 3.000000 | NSF57HT |
| 6 | 34.724000 | 11.951096 | |
| 7 | −44.668000 | 2.500000 | SFPL53 |
| 8 | 38.404000 | 16.100000 | NSK16 |
| 9 | −44.668000 | 2.500000 | |
| 10 | 143.300000 | 4.000000 | NSF10 |
| 11 | 0.000000 | 6.052053 | |
| 12 | −55.831000 | 3.300000 | NLASF44 |
| 13 | −124.090000 | 0.682471 | |
| 14 | 43.714000 | 4.200000 | NLASF44 |
| 15 | 33.497000 | 6.277940 | |
| 16 | 50.481000 | 9.700000 | NSF1 |
| 17 | −311.710000 | 17.211876 | |
| 18 | 0.000000 | 2.000000 | — |
| 19 | 116.310000 | 14.100000 | SFPL51 |
| 20 | −48.348000 | 0.300000 | |
| 21 | −183.481769 | 2.700000 | SLAH53 |
| 22 | 34.227000 | 1.921019 | |
| 23 | 42.474000 | 13.500000 | SFPL53 |
| 24 | −33.497000 | 0.300000 | |
| 25 | −530.880000 | 2.200000 | NLASF40 |
| 26 | 32.313000 | 11.500000 | SFPL53 |
| 27 | −58.294000 | 4.205019 | |
| 28 | 97.163000 | 11.800000 | SFPL51 |
| 29 | −34.724000 | 0.000000 | |
| 30 | 0.000000 | 36.397422 | — |

Aspheric surface No. 1:
Asphere type: conical constant:
CSA 0.000000000E+00
Asphere constants:
$c_1 = 2.138410558E{-}06$
$c_2 = -7.813837178E{-}10$
$c_3 1.267806896E{-}12$
$c_4 = -1.341503588E{-}15$
$c_5 = 9.878056126E{-}19$
$c_6 = -3.869146575E{-}22$
$c_7 = 6.576152649E{-}26$ Aspheric surface No. 21:
Asphere type: conical constant:
CSA 0.000000000E+00
Asphere constants:
$c_1 = -1.002414545E{-}05$
$c_2 = 5.931864360E{-}10$
$c_3 = 7.136430627E{-}12$.

9. A method for compensating for an aperture aberration caused by a filter arranged in a camera, comprising the step of applying a lens to the camera, the lens comprising a housing, an actuating element arranged on the housing, and a lens element system that can be set into a plurality of settings, wherein the lens element system is embodied in such a way that in at least one setting an f-number is F≤3, wherein the lens element system is further embodied in such a way that an actuation of the actuating element by a user brings about a movement of two optical elements relative to one another, such that an intersection length difference of the lens element system can be set in a targeted manner.

10. The method of claim 9, further including the step of actuating the actuating element to move the two optical elements relative to one another without changing the setting of the f-number.

11. A lens for a camera, comprising a housing, an actuating element arranged on the housing and a lens element system that can be set into a plurality of settings, wherein the lens element system is embodied in such a way that in at least one setting an f-number is F≤3, wherein the lens element system is furthermore embodied in such a way that an actuation of the actuating element brings about a movement of two optical elements relative to one another, such that an intersection length difference of the lens element system can be set, wherein the lens element system has a third lens element group arranged on the image side of an aperture stop, wherein the two optical elements are formed by two adjacent lens elements of the third lens element group, and wherein a lens element of the adjacent lens elements that is arranged on the image side is an aspheric lens element.

12. The lens according to claim 11, wherein the aspheric lens element is an aspheric cemented element, in particular having the following data:

| Surface No. | Radius [mm] | Thickness [mm] | Type of glass |
|---|---|---|---|
| 1' | −200.648147 | 3.600000 | SLAH53 |
| 2' | 34.294956 | 12.905203 | SFPL53 |
| 3' | −48.773904 | | |

Aspheric surface No. 1':
Asphere type: conical constant:
CSA 0.000000000E+00
Asphere constants:
$c_1 = -5.280909907E-06$
$C_2 = 1.504667518E-09$
$C_3 = -8.408238291E-13$
$C_4 = 8.471013661E-16$.

13. The lens according to claim 12, wherein the lens element system has the following data:
Aperture surface: 14

| Surface No. | Radius [mm] | Thickness [mm] | Type of glass |
|---|---|---|---|
| 1 | 180.119729 | 6.500000 | SPHM52 |
| 2 | 38.688375 | 20.002248 | |
| 3 | 171.010743 | 5.000000 | SFPL51 |
| 4 | 36.946638 | 8.836063 | |
| 5 | 77.611721 | 4.500000 | NSF57HT |
| 6 | 32.107934 | 15.773184 | |
| 7 | −43.084941 | 4.400000 | SFPL53 |
| 8 | 43.075059 | 16.399791 | NSK16 |
| 9 | −54.554119 | 10.988557 | |
| 10 | 52.586703 | 3.700000 | NLASF44 |
| 11 | 35.893774 | 12.496658 | |
| 12 | 56.108740 | 8.641316 | NSF1 |
| 13 | 0.000000 | 26.631826 | |
| 14 | 0.000000 | 11.683115 | — |
| 15 | 61.705916 | 11.114398 | SFPL51 |
| 16 | −70.026143 | 1.631465 | |
| 17 | −200.648147 | 3.600000 | SLAH53 |
| 18 | 34.294956 | 12.905203 | SFPL53 |
| 19 | −48.773904 | 0.300000 | |
| 20 | −1634.003859 | 3.700000 | NLASF40 |
| 21 | 43.330919 | 10.819207 | SFPL53 |
| 22 | −84.305387 | 0.100000 | |
| 23 | 63.360404 | 11.621284 | SFPL51 |
| 24 | −44.079624 | 0.000000 | |
| 25 | 0.000000 | 35.553756 | — |

Aspheric surface No. 1:
Asphere type: conical constant:
CSA 0.000000000E+00
Asphere constants:
$c_1 = 2.037022717E-06$
$c_2 = -5.369449900E-10$
$c_3 1.625392430E-13$
$c_4 = -1.343471905E-17$
Aspheric surface No. 17:
Asphere type: conical constant:
CSA 0.000000000E+00
Asphere constants:
$c_1 = -5.280909907E-06$
$c_2 = 1.504667518E-09$
$c_3 = -8.408238291E-13$
$c_4 = 8.471013661E-16$.

14. A lens for a camera, comprising a housing, an actuating element arranged on the housing, and a lens element stem that can be set into a plurality of settings, wherein the lens element system is embodied in such a way that in at least one setting an f-number is F≤3, wherein the lens element system is furthermore embodied in such a way that an actuation of the actuating element brings about a movement of two optical elements relative to one another, such that an intersection length difference of the lens element system can be set, wherein an actuation of the actuating element brings about a movement of the two optical elements relative to one another perpendicular to an optical axis of the lens element system.

15. The lens according to claim 14, wherein the two optical elements are two glass wedge elements bearing against one another by their respective wedge surfaces, said glass wedge elements jointly forming a plane-parallel optical element arranged perpendicular to an optical axis of the lens element system, wherein an actuation of the actuating element brings about a change in a thickness of the plane-parallel optical element, said thickness being parallel to the optical axis.

16. The lens according to claim 15, wherein the lens element system is embodied in such a way as to compensate for an intersection length difference for a maximum settable thickness of the plane-parallel optical element.

17. The lens according to claim 14, wherein the two optical elements form an image-side termination of the lens element system.

* * * * *

UNITED STATES PATENT AND TRADEMARK OFFICE
CERTIFICATE OF CORRECTION

PATENT NO. : 8,687,290 B2
APPLICATION NO. : 13/549011
DATED : April 1, 2014
INVENTOR(S) : Dirk Jahn et al.

It is certified that error appears in the above-identified patent and that said Letters Patent is hereby corrected as shown below:

In the Claims:

Column 19,
Line 30 (Claim 6), "s stem" should be -- system --.
Line 33 (Claim 6), "s stem" should be -- system --.
Line 45 (Claim 7), "s stem" should be -- system --.

Column 20,
Line 40 (Claim 8), "$c_3 1.267806896E-12$" should be -- $c_3 = 1.267806896E-12$ --.

Column 21,
Line 32 (Claim 12), "$C_2 = 1.504667518E-09$" should be -- $c_2 = 1.504667518E-09$ --.
Line 33 (Claim 12), "$C_3 = 8.408238291E-13$" should be -- $c_3 = 8.408238291E-13$ --.
Line 34 (Claim 12), "$C_4 = 8.471013661E-16$" should be -- $c_4 = 8.471013661E-16$ --.

Column 22,
Line 19 (Claim 13), "$c_3 1.625392430E-13$" should be -- $c_3 = 1.625392430E-13$ --.
Line 29 (Claim 14), "stem" should be -- system --.

Signed and Sealed this
Twenty-fourth Day of June, 2014

Michelle K. Lee
*Deputy Director of the United States Patent and Trademark Office*